US012755266B2

(12) United States Patent
Wulff et al.

(10) Patent No.: US 12,755,266 B2
(45) Date of Patent: Oct. 6, 2026

(54) SYSTEM FOR COMMERCIAL SERVICES OR FACILITIES

(71) Applicant: AIRWALLET APS, Odense C (DK)

(72) Inventors: Juri Wulff, Odense S (DK); Christian Bonde Mortensen, Vindegade (DK)

(73) Assignee: Airwallet ApS, Odense C. (DK)

( * ) Notice: Subject to any disclaimer, the term of this patent is extended or adjusted under 35 U.S.C. 154(b) by 252 days.

(21) Appl. No.: 18/560,720

(22) PCT Filed: May 16, 2022

(86) PCT No.: PCT/EP2022/063191

§ 371 (c)(1),
(2) Date: Nov. 14, 2023

(87) PCT Pub. No.: WO2022/243244

PCT Pub. Date: Nov. 24, 2022

(65) Prior Publication Data

US 2024/0257093 A1 Aug. 1, 2024

(30) Foreign Application Priority Data

May 17, 2021 (DK) ............................. PA202100510

(51) Int. Cl.
*G06F 15/173* (2006.01)
*D06F 31/00* (2006.01)
*D06F 34/05* (2020.01)
*G06Q 20/32* (2012.01)
*D06F 105/58* (2020.01)

(52) U.S. Cl.
CPC ........... *G06Q 20/327* (2013.01); *D06F 31/00* (2013.01); *D06F 34/05* (2020.02); *D06F 2105/58* (2020.02)

(58) Field of Classification Search
CPC ....... G06Q 20/327; D06F 34/05; D06F 31/00; D06F 2105/58
USPC ........................................................ 709/225
See application file for complete search history.

(56) References Cited

U.S. PATENT DOCUMENTS

| | | | | |
|---|---|---|---|---|
| 8,010,623 | B1 | 8/2011 | Fitch et al. | |
| 2017/0081796 | A1 | 3/2017 | Belveal et al. | |
| 2017/0082991 | A1 * | 3/2017 | Belveal | D06F 39/00 |
| 2018/0305856 | A1 * | 10/2018 | Welch | G06Q 20/18 |
| 2019/0166470 | A1 | 5/2019 | Postrel | |
| 2021/0329451 | A1 * | 10/2021 | Jun | H04L 67/125 |

(Continued)

FOREIGN PATENT DOCUMENTS

| | | | |
|---|---|---|---|
| CN | 108 053 574 | A | 5/2018 |
| CN | 109 811 507 | A | 5/2019 |

(Continued)

OTHER PUBLICATIONS

Espacenet, Bibliographic data, including Inventor/Applicant and Abstract in English for application KR20200015984 filed Feb. 10, 2020, published as KR20200021487A on Feb. 28, 2020, 3 pages.

(Continued)

*Primary Examiner* — Alan S Chou
(74) *Attorney, Agent, or Firm* — Morse, Barnes-Brown & Pendleton PC; Sean D. Detweiler, Esq.

(57) ABSTRACT

The present invention relates to systems for commercial services or facilities, including a machine, a mobile device, a control unit, and a management component.

10 Claims, 5 Drawing Sheets

(56) References Cited

U.S. PATENT DOCUMENTS

2023/0345220 A1* 10/2023 Stocks .................... H04W 4/80

FOREIGN PATENT DOCUMENTS

KR 202000021487 A 2/2020
WO 2020198851 A1 10/2020

OTHER PUBLICATIONS

Canadian Patent Database, Patent 3038549 Summary, including Inventor/Applicant and Abstract in English for application CA3038549 filed Apr. 1, 2019, Open to Public Inspection Oct. 1, 2020, 2 pages.
Danish Patent and Trademark Office, Search Report—Patent—application PA 2021 00510, report completed Dec. 1, 2021, 8 pages.
International Search Report, Application PCT/EP2022/063191, mailed Sep. 8, 2022, 3 pages.
DEPATISnet Bibliographic data including English Abstract, application CN 201711318618, published as CN108053574A, May 18, 2018, 3 pages.
DEPATISnet Bibliographic data including English Abstract, application CN 20110006799, published as CN109811507A, May 28, 2019.
Written Opinion of the International Searching Authority (ISA/EP), Application PCT/EP2022/063191, 8 pages.

* cited by examiner

SYSTEM FOR COMMERCIAL SERVICES OR FACILITIES

CROSS-REFERENCE TO RELATED APPLICATIONS

This application is a national stage application under 35 U.S.C. 371 of International Application No. PCT/EP2022/063191, filed May 16, 2022, which claims priority to Danish Patent Application No. PA2021 00510, filed May 17, 2021, and is incorporated by reference.

TECHNICAL FIELD OF THE INVENTION

The present invention relates to systems for commercial services or facilities.

BACKGROUND OF THE INVENTION

Today, users of digital payment applications in shared laundries must scan QR codes, NFC tags, bar codes, or enter machine and location identifiers when they want to use a specific machine. However, laundry machines can be manipulated by entering wrong machine identifiers, especially if the machine identifiers are similar for different locations.

Alternatively, the users need to scan for machines nearby via Bluetooth beacons or Wi-Fi hotspots. However, laundry machines requiring WAN or LAN are more expensive to install and have recurring costs for the data connection. Furthermore, WAN or LAN connections have issues when network parameters are changed. Sim-card based payment systems give the customer higher uptime but also suffers from incurring additional charges to the customers.

It is an objective of the present invention to provide a system that solves or at least minimizes the above-mentioned problems.

SUMMARY OF THE INVENTION

The inventors of the present invention have developed a commercial laundry services and facilities securing optimal turnover and reduced downtime. This system may also be used for other types of commercial services or facilities.

A first aspect relates to a system for commercial services, such as laundry services, or service facilities comprising:

- a machine, such as a laundry machine, or a door lock;
- a mobile device comprising a transceiver unit;
- a control unit comprising a transceiver unit, operably connected to said machine, and communicatively coupled to said mobile device; and
- a management component comprising a transceiver unit, being part of a cloud platform, and communicatively coupled to said mobile device;

wherein said control unit is configured to transmit a wireless signal using a short-range wireless transmission protocol, said signal comprising an identification code for said machine;

wherein said mobile device is configured to transmit and receive wireless signals using a short-range wireless transmission protocol, and to transmit and receive wireless signals using a long-range wireless transmission protocol;

wherein said management component is configured to transmit and receive wireless signals using a long-range and/or a short-range wireless transmission protocol;

wherein said management component is configured to transmit a list of pre-approved identification codes to said mobile device using said long-range and/or short-range wireless transmission protocol, each of said identification codes corresponding to a machine;

wherein said mobile device is configured to, using said short-range wireless transmission protocol, search for wireless signals comprising a pre-approved identification code from said list of pre-approved identification codes, and to communicate identified pre-approved identification codes to said management component using said long-range and/or short-range wireless transmission protocol;

wherein said management component, upon receipt of a pre-approved identification code from said mobile device, is configured to transmit location data of said machine, and data related to status and/or available time slots for said machine, or said area controlled by said machine, to said mobile device using said long-range and/or short-range wireless transmission protocol;

wherein said mobile device is configured to present said data, and to use said short-range wireless transmission protocol to transmit an activation signal to said control unit upon receipt of a user selection for use of said machine or said area controlled by said machine.

In the resent context, the term "machine" is to include a lock controlling a door or gate to an area, such as a sports field, a sauna area, a tanning bed area, a laundry service facility/area, or the like, but may obviously also include a machine to be used, such as a sauna, a tanning bed, a solarium, a laundry machine, or the like.

A second aspect relates to a system for commercial laundry services and facilities comprising:

- a laundry machine;
- a mobile device comprising a transceiver unit;
- a control unit comprising a transceiver unit, operably connected to said laundry machine, and communicatively coupled to said mobile device; and
- a management component comprising a transceiver unit, being part of a cloud platform, and communicatively coupled to said mobile device;
- wherein said control unit is configured to transmit a wireless signal using a short-range wireless transmission protocol, said signal comprising an identification code for said laundry machine;
- wherein said mobile device is configured to transmit and receive wireless signals using a short-range wireless transmission protocol, and to transmit and receive wireless signals using a long-range wireless transmission protocol;
- wherein said management component is configured to transmit and receive wireless signals using a long-range wireless transmission protocol;
- wherein said management component is configured to transmit a list of pre-approved identification codes to said mobile device using said long-range wireless transmission protocol, each of said identification codes corresponding to a laundry machine;
- wherein said mobile device is configured to, using said short-range wireless transmission protocol, search for wireless signals comprising a pre-approved identification code from said list of pre-approved identification codes, and to communicate identified pre-approved identification codes to said management component using said long-range wireless transmission protocol;
- wherein said management component, upon receipt of a pre-approved identification code from said mobile device, is configured to transmit location data of said laundry machine, and data related to status and/or available time slots for said laundry machine to said mobile device using said long-range wireless transmission protocol;

wherein said mobile device is configured to present said data, and to use said short-range wireless transmission protocol to transmit an activation signal to said control unit upon receipt of a user selection for use of said laundry machine.

Another aspect relates to a system for commercial laundry services and facilities comprising:

a laundry machine;

a mobile device comprising a transceiver unit;

a control unit comprising a transceiver unit, operably connected to said laundry machine, and communicatively coupled to said mobile device; and a management component comprising a transceiver unit, being part of a cloud platform, and communicatively coupled to said mobile device;

wherein said control unit is configured to transmit a wireless signal using a short-range wireless transmission protocol, said signal comprising an identification code for said laundry machine;

wherein said mobile device is configured to transmit and receive wireless signals using a short-range wireless transmission protocol, and to transmit and receive wireless signals using a long-range wireless transmission protocol;

wherein said management component is configured to transmit and receive wireless signals using a long-range and/or a short-range wireless transmission protocol;

wherein said management component is configured to transmit a list of pre-approved identification codes to said mobile device using said long-range and/or short-range wireless transmission protocol, each of said identification codes corresponding to a laundry machine;

wherein said mobile device is configured to, using said short-range wireless transmission protocol, search for wireless signals comprising a pre-approved identification code from said list of pre-approved identification codes, and to communicate identified pre-approved identification codes to said management component using said long-range and/or short-range wireless transmission protocol;

wherein said management component, upon receipt of a pre-approved identification code from said mobile device, is configured to transmit location data of said laundry machine, and data related to status and/or available time slots for said laundry machine to said mobile device using said long-range and/or short-range wireless transmission protocol;

wherein said mobile device is configured to present said data, and to use said short-range wireless transmission protocol to transmit an activation signal to said control unit upon receipt of a user selection for use of said laundry machine.

DETAILED DESCRIPTION OF THE INVENTION

Figure 1:
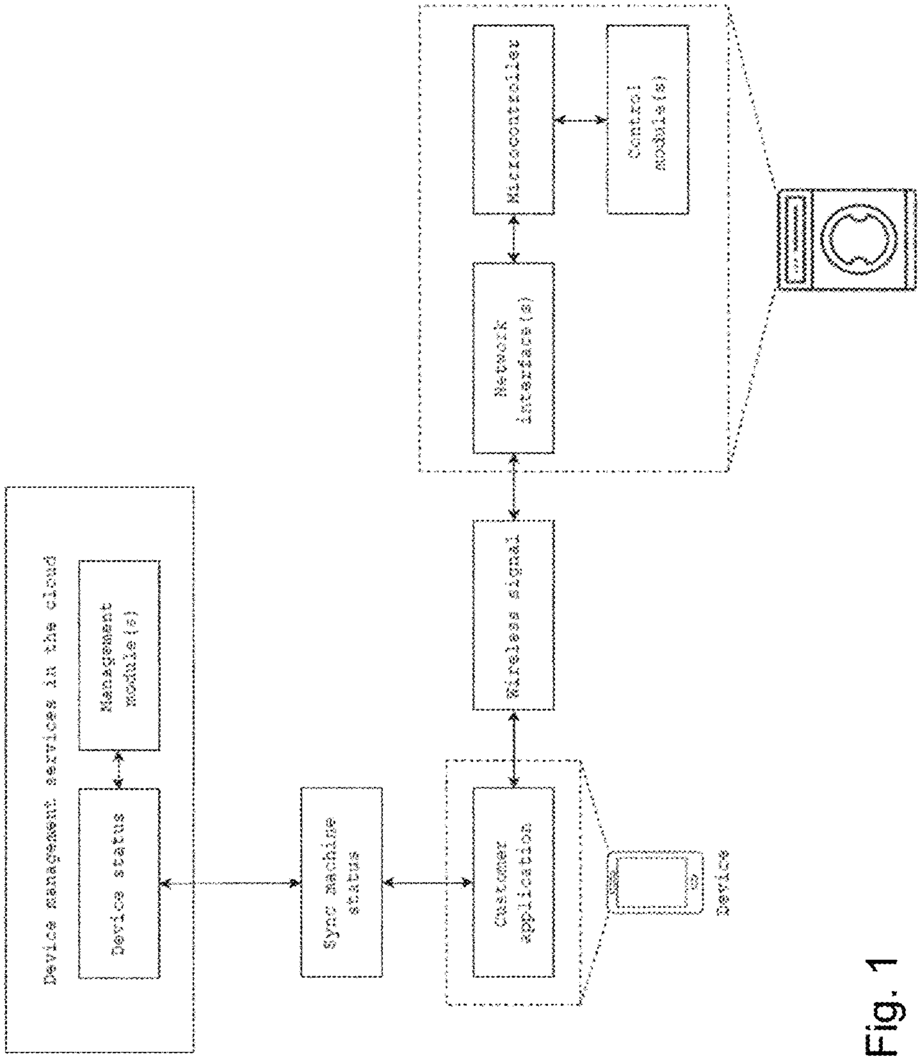
FIG. 1 shows a system according to the present invention.
Figure 2:
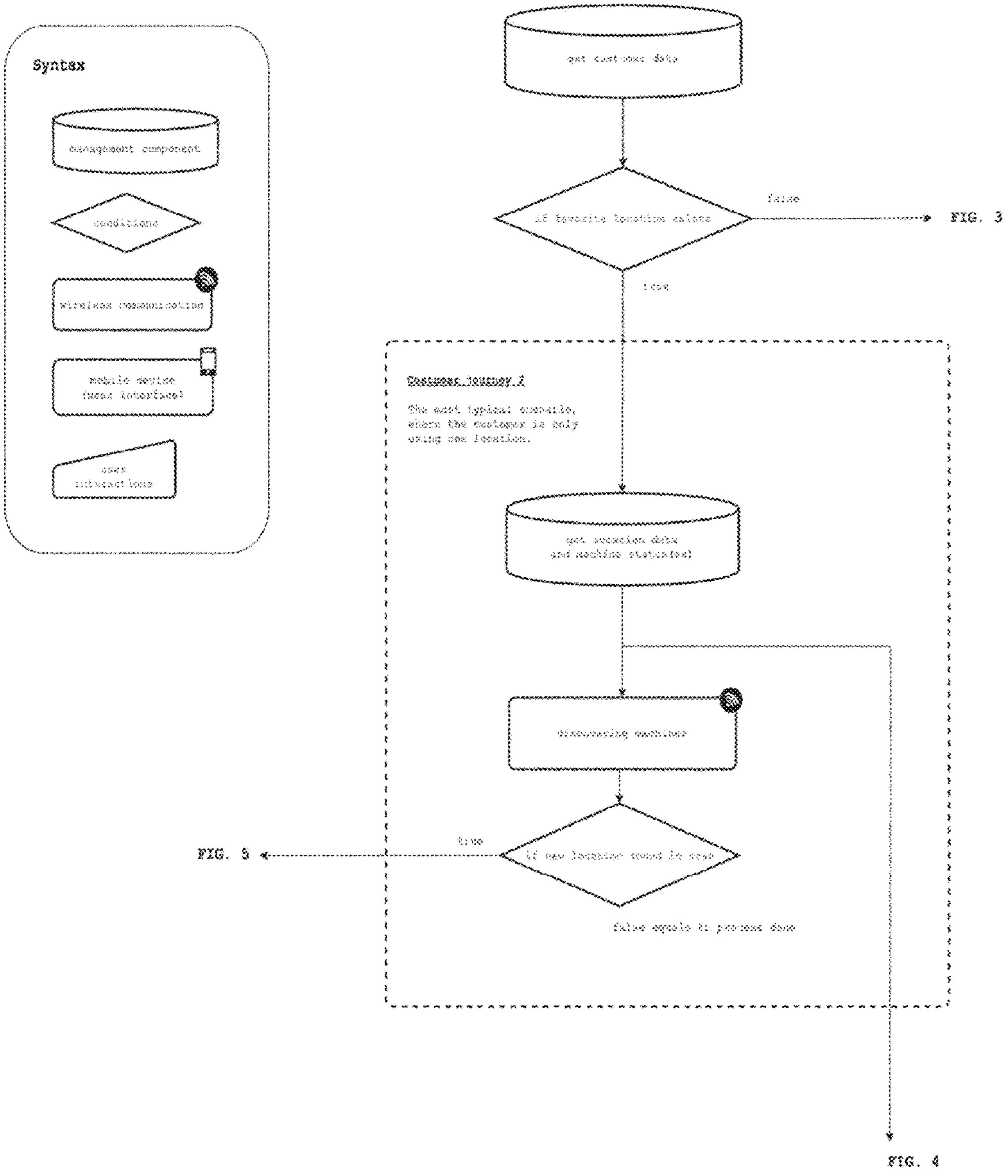
FIG. 2 is a flow diagram representing an embodiment of a part of Customer journey 2 according to the present invention.
Figure 3:
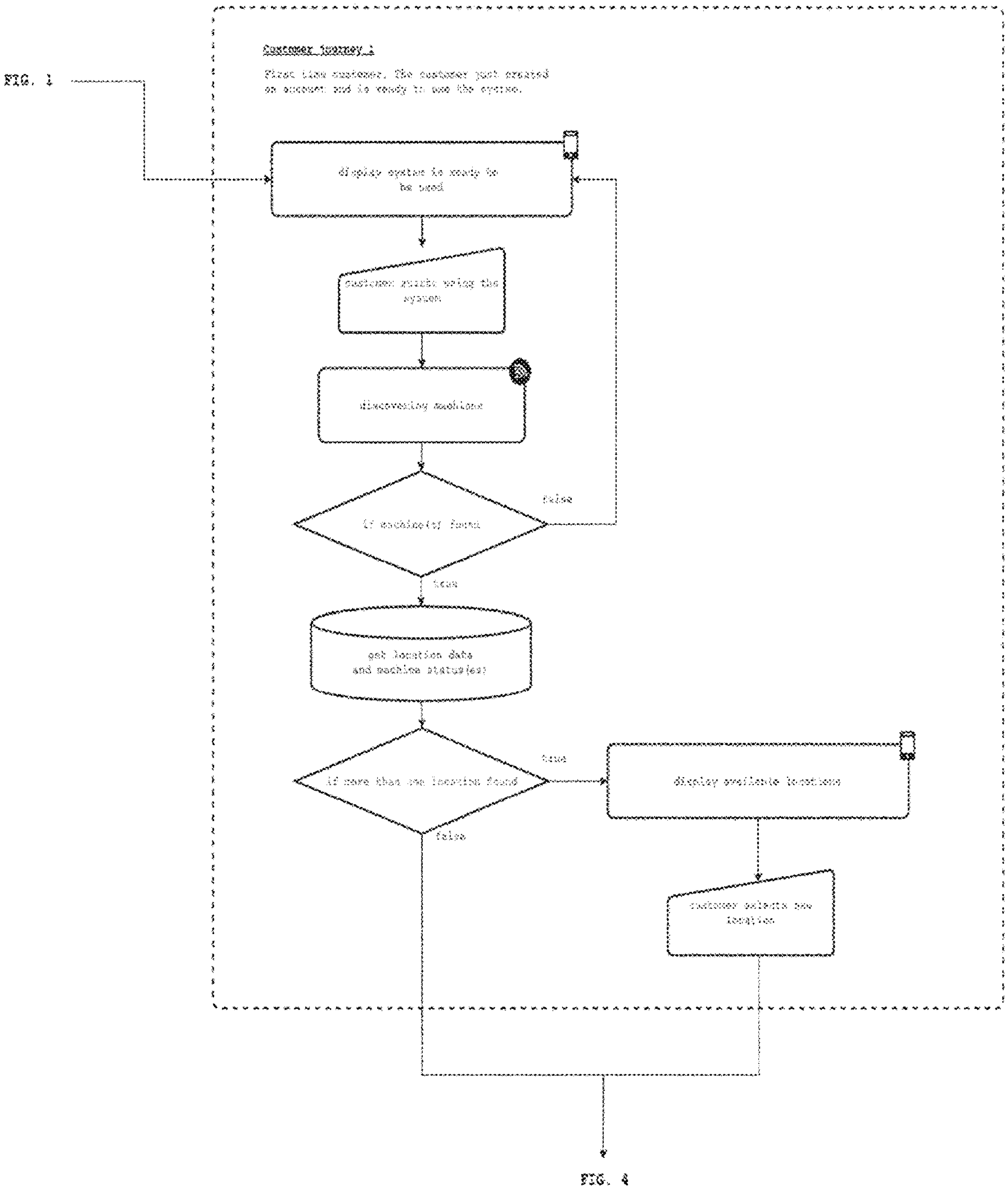
FIG. 3 is a flow diagram representing an embodiment of a part of Customer journey 1 according to the present invention.
Figure 4:
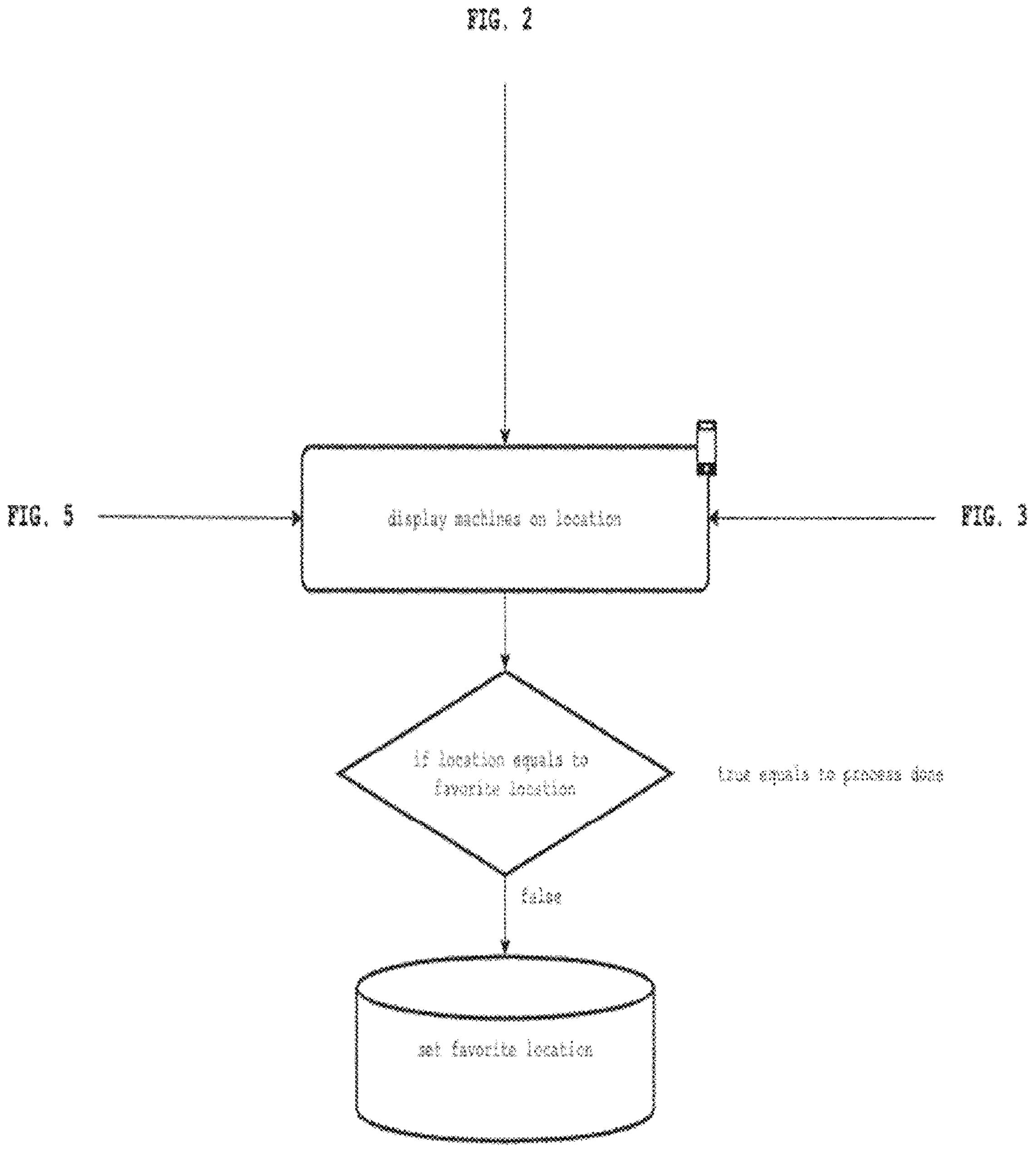
FIG. 4 is a flow diagram representing an embodiment of a final part of Customer journeys 1-3 according to the present invention.
Figure 5:
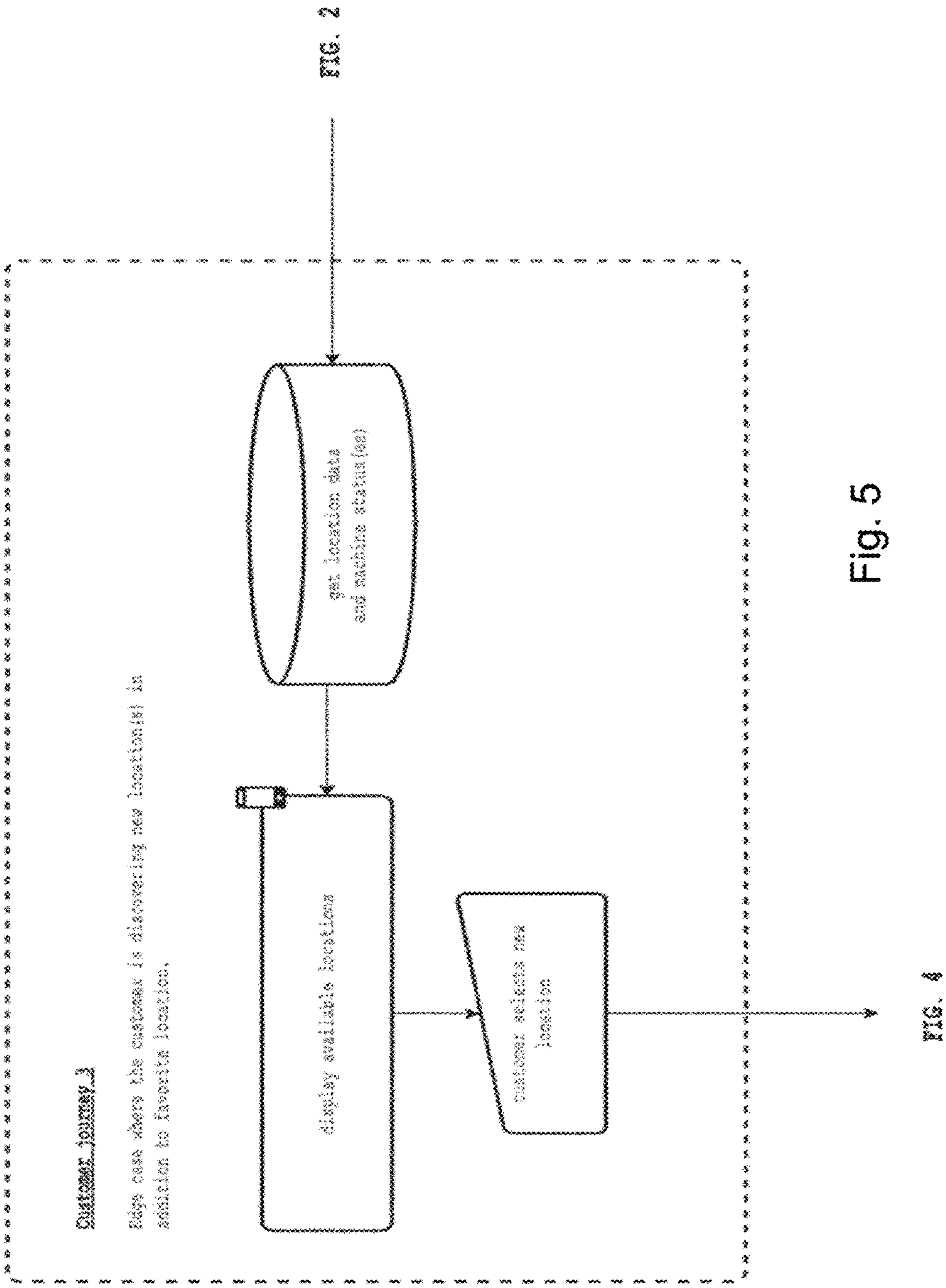
FIG. 5 is a flow diagram representing an embodiment of a part of Customer journey 3 according to the present invention.

By providing a system according to the present invention, the user thereof beneficially secures optimal turnover and reduced downtime.

A first aspect relates to a system for commercial services, such as laundry services, or service facilities comprising:

a machine, such as a laundry machine, or a door lock;

a mobile device comprising a transceiver unit;

a control unit comprising a transceiver unit, operably connected to said machine, and communicatively coupled to said mobile device; and a management component comprising a transceiver unit, being part of a cloud platform, and communicatively coupled to said mobile device;

wherein said control unit is configured to transmit a wireless signal using a short-range wireless transmission protocol, said signal comprising an identification code for said machine;

wherein said mobile device is configured to transmit and receive wireless signals using a short-range wireless transmission protocol, and to transmit and receive wireless signals using a long-range wireless transmission protocol;

wherein said management component is configured to transmit and receive wireless signals using a long-range and/or a short-range wireless transmission protocol;

wherein said management component is configured to transmit a list of pre-approved identification codes to said mobile device using said long-range and/or short-range wireless transmission protocol, each of said identification codes corresponding to a machine;

wherein said mobile device is configured to, using said short-range wireless transmission protocol, search for wireless signals comprising a pre-approved identification code from said list of pre-approved identification codes, and to communicate identified pre-approved identification codes to said management component using said long-range and/or short-range wireless transmission protocol;

wherein said management component, upon receipt of a pre-approved identification code from said mobile device, is configured to transmit location data of said machine, and data related to status and/or available time slots for said machine, or said area controlled by said machine, to said mobile device using said long-range and/or short-range wireless transmission protocol;

wherein said mobile device is configured to present said data, and to use said short-range wireless transmission protocol to transmit an activation signal to said control unit upon receipt of a user selection for use of said machine or said area controlled by said machine.

A second aspect relates to a system for commercial laundry services and facilities comprising:

a laundry machine;

a mobile device comprising a transceiver unit;

a control unit comprising a transceiver unit, operably connected to said laundry machine, and communicatively coupled to said mobile device; and a management component comprising a transceiver unit, being part of a cloud platform, and communicatively coupled to said mobile device;

wherein said control unit is configured to transmit a wireless signal using a short-range wireless transmission protocol, said signal comprising an identification code for said laundry machine;

wherein said mobile device is configured to transmit and receive wireless signals using a short-range wireless transmission protocol, and to transmit and receive wireless signals using a long-range wireless transmission protocol;

wherein said management component is configured to transmit and receive wireless signals using a long-range and/or a short-range wireless transmission protocol;

wherein said management component is configured to transmit a list of pre-approved identification codes to said mobile device using said long-range and/or short-range wireless transmission protocol, each of said identification codes corresponding to a laundry machine;

wherein said mobile device is configured to, using said short-range wireless transmission protocol, search for wireless signals comprising a pre-approved identification code from said list of pre-approved identification codes, and to communicate identified pre-approved identification codes to said management component using said long-range and/or short-range wireless transmission protocol;

wherein said management component, upon receipt of a pre-approved identification code from said mobile device, is configured to transmit location data of said laundry machine, and data related to status and/or available time slots for said laundry machine to said mobile device using said long-range and/or short-range wireless transmission protocol;

wherein said mobile device is configured to present said data, and to use said short-range wireless transmission protocol to transmit an activation signal to said control unit upon receipt of a user selection for use of said laundry machine.

An example of a system according to the present invention is shown in FIG. 1. In the following embodiments, the laundry machine could be substituted by any type of machine as described above.

The present disclosure describes possible implementations of the present invention and are exemplified in the following Customer journeys, which are also depicted in FIGS. 2-5.

Customer Journey 1

New Customer Scenario

The first time a new customer (app user) uses the system of the present invention, the following scenario will occur.

After signing up with a user in the app, the customer will be prompted with a message that says, “The system is now ready to be used” accompanied by a button that says, “I'm in my laundry basement”. When the customer presses the button a discovery process will start. The discovery process is a wireless communication between the customer's mobile (computing) device and the control unit operably connected to the laundry machine, combined with a wireless communication between the customer's mobile device and the management component, including cloud services.

If the discovery process performed by the mobile device finds a control unit that is identified as a pre-approved laundry machine (e.g., via an identification code or the like), the mobile device will communicate with the management component to retrieve the location the customer is located at. The retrieved location (including all the pre-approved laundry machines, that is holds) will now be displayed to the customer in the app on the mobile device. After a favorite location is confirmed by the user through a user interface, the customer can now choose any pre-approved laundry machine at that location in the app. After a laundry machine is selected, the app will connect directly to that device via the control unit.

In a preferred embodiment, when the user is remote (i.e., not located near any pre-approved laundry machine), the app will display “The system is now ready to be used” accompanied by a button that says, “I'm in my laundry basement”. Tapping the button will result in a loading indicator for up to 4 seconds while trying to discover a location. If no pre-approved laundry machines are found, the app will return to displaying the same message/button.

Customer Journey 2

Default Customer Scenario

In most cases, the customers will experience this journey post customer journey 1.

The management component may wirelessly communicate information to a user mobile device, and such information may be presented within a customer application (e.g., a mobile app) executing on the user mobile device. The customer application may enable a user to create a user account with the laundry service. The user may at all times login to the laundry service of the management component, using the user interface (UI) of the customer application, and request availability information of the favorite location describing one or more laundry machines (e.g., washers, dryers, and so forth) that are currently available for use. However, the laundry machines cannot be activated.

This means that a customer needs to have an account created prior to this journey. The journey starts with the customer opening the app on the mobile device. The user will now be presented with the favorite location (the location that was discovered during customer journey 1). The customer can now select a laundry machine and activate it as long as the mobile device is within reach of the control unit. In a preferred embodiment, when the user is remote (i.e., not located near any pre-approved laundry machines), the app will still display the favorite location and all the pre-approved laundry machines at that location. Tapping a machine icon will result in a loading indicator, while the mobile device tries to connect to the control unit. After e.g., 4 seconds the connection times out and a message with, “Move closer to the machine” accompanied with a button that says “Retry”.

Customer Journey 3

Multiple Locations Scenario

In the case where the customer has a favorite location but goes to another location the app will make a pop-up banner that informs the customer a new location is available. The customer can then choose to switch over to the new location. The user may be allowed to change that location to be the new favorite location or keep the old favorite location.

An Example with Multiple Locations

A customer rents an apartment where the system according to the present invention is used in a shared laundry facility. This location will be referred to as, “Home”. The customer's apartment is a unit in a block. Another block is located next to the customer's apartment block. Both blocks are owned by the same landlord. Each block has a shared laundry facility in the basement. The landlord has installed the system according to the present invention in each laundry facility. The landlord has also made a house rule that states; "If there are no available machines in the laundry facility located in your block, you may go to the block next door and use their machines". This location will be referred to as, "Next".

The customer uses the location "Home" around two times a week, but one time every second month all machines are occupied. In this situation, the customer walks to the laundry facility, "Next", next door. The customer now opens the app and sees location "Home". But after four seconds, a notification banner pops up notifying that a new location has been found. The customer can tap the banner and see that it is location "Next". The customer selects "Next" as favorite location. Now machines for location "Next" is shown and the customer can select an available laundry machine.

Some days after, the customer needs to wash again. The customer now enters the "Home" location. The customer opens the app, and the location "Next" is shown. After 4 seconds the app displays that a new location has been found. This new location is the "Home" location. Now the customer can switch to "Home" and use the app as previous explained.

The use of a short-range wireless transmission protocol to communicate between the mobile (computing) device and the laundry machine (via the control unit operably connected thereto) secures that the user must be present close to/near the laundry machine to activate it. The term "short-range wireless transmission protocol" is used herein to refer to technologies that permit electronic devices to communicate with other electronic devices that are nearby, usually within 1-20 meters. Examples of such technologies are IEEE 802.11, IEEE 802.15.4, Bluetooth, including Bluetooth low energy, and Zigbee. The IEEE 802.15.4 standard defines the basic physical layer (PHY), including frequency range, modulation, data rates, and frame format, and the media access control (MAC) layer. Individual protocols are designed to use the basic PHY and MAC, such as ISA100, Wireless HART, ZigBee, MiWi, SNAP, and 6LoPAN. The IEEE 802.15.4 standard defines three basic frequency ranges. The most widely used is the worldwide 2.4-GHz ISM band (16 channels). The basic data rate is 250 kbits/s. Another range is the 902-928 MHz ISM band in the U.S. (10 channels). The data rate is 40 kbits/s or 250 kbits/s. Furthermore, there is the European 868-MHz band (one channel) with a data rate of 20 kbits/s. All three ranges use direct sequence spread spectrum (DSSS) with either binary phase-shift keying (BPSK) or offset quadrature phase-shift keying (QPSK) modulation. The multiple access mode is carrier sense multiple access with collision avoidance (CSMA-CA). The minimum defined power levels are −3 dBm (0.5 mW). The most common power level is 0 dBm. Typical range is less than 10 meters. Preferably, the short-range wireless transmission protocol for use in the present invention is utilizing the 868 MHz ISM band or the 902-928 MHz ISM band (915 MHZ).

In one or more embodiments, the short-range wireless transmission is performed in the industrial, scientific and medical (ISM) radio bands, preferably in the 902-928 MHz, 868.0-870.0 MHz, and/or 433.05-434.79 MHz frequency bands.

The other communication path between the mobile (computing) device and the management component is performed wirelessly and could either be via a short-range wireless transmission protocol and/or a long-range wireless transmission protocol. The term "long-range wireless transmission protocol" is used herein to refer to technologies that permit electronic devices to communicate with other electronic devices that are far from one another, usually further than 1000 meters from one another. Examples of such technologies are Sigfox, LoRa, and NB-IoT. The advantage of communicating data using a long-range wireless transmission protocol is the high penetration rate and the long range. The high penetration rate is necessary as the signal must be able to pass from a basement of a building and through the building structure. The network is preferably a Low Power Wide Area Network (LPWAN). LPWAN is a type of wireless telecommunication wide area network designed to allow long range communications at a low bit rate. The LPWAN data rate according to the present invention preferably ranges from 50 bit per second to 1000 bit per second per channel, such as within 100-600 bit per second per channel.

In one or more embodiments, the long-range wireless transmission protocol is selected from the group consisting of LTE Cat M1 (eMTC), LTE Cat NB1 (NB-IoT), LoRa, and Sigfox.

The management component is the part of the system that processes the data received by the mobile device. The management component comprises a processor, a memory in electronic communication with said processor, and instructions stored in said memory. The instructions are executable by the processor to perform a number of tasks, including receive and store data related to an event detected or registered by the mobile device, process said data related to said detected or registered event, and generate a notification for a user of said cloud platform based on the processing of said data. The event may e.g., be a registered change in the availability of the laundry machines, such as a laundry machine being available before expected time, a laundry machine needing service, or a new booked time slot. In the present context, the term "management component" may be software, firmware, middleware, microcode, hardware, and/or any combination thereof. For example, the management component or the manager may be any one or a combination of a module, a process, and a thread that are run on a general-purpose server or may be a general-purpose server. There may be one or more management components or managers. The management component or the manager may be located on one general-purpose server or may be distributed on at least two general-purpose servers. The management component or the manager may be obtained from a computer readable medium that stores various data structures and then is executed or may be implemented by using various logical combinations of a hardware circuit.

The term "cloud platform" as used herein is intended to be broadly construed, so as to encompass a computer, server or backend device coupled to a network, and should not be viewed as requiring any particular geographical relationship relative to the laundry machines for which it is responsible.

The management component may comprise a data collection and processing component. The term "data collection and processing component" as used herein means a system implemented at least in part by hardware and comprising an input device, an output device, and a processor connected to the input device to receive data from it and connected to the output device to provide data processed for it. The data collection and processing component may be configured to acquire data from the mobile device(s).

In one or more embodiments, the system comprises a plurality of laundry machines at a given location, wherein said management component, upon receipt of a pre-approved identification code from said mobile device, is configured to transmit location data of said laundry machine corresponding to said pre-approved identification code, and data related to status and/or available time slots for all of said laundry machines at said location to said mobile device using said long-range and/or short-range wireless transmission protocol; and wherein said mobile device is configured to present said data, and to use said short-range wireless transmission protocol to transmit an activation signal to said control unit upon receipt of a user selection for use of one of said laundry machines. Hence, this embodiment includes a control unit configured for handling/operating multiple laundry machines. In general, the control unit may send a control signal that causes an altering of an operational state of a laundry machine to enable use of the laundry machine during a period of time.

In one or more embodiments, the system comprises a laundry machine positioned at a first and a second location, each within short-range wireless reach of said mobile device; wherein said management component, upon receipt of a pre-approved identification code from said mobile device, is configured to transmit, using said long-range and/or short-range wireless transmission protocol, to said mobile device:

a) location data of said laundry machine corresponding to said pre-approved identification code positioned at said first location, and data related to status and/or available time slots for said laundry machine and, optionally, other laundry machines at said first location; and b) location data of said laundry machine(s) positioned at said second location, and data related to status and/or available time slots for all of said laundry machines on said second location;

wherein said mobile device is configured to present said first and second locations as optional selections, and in response to a user selection of either said first location, or said second location, configured to present said data related to said selection, and to use said short-range wireless transmission protocol to transmit an activation signal to said control unit upon receipt of a user selection for use of one of said laundry machines. This configuration allows the system to handle multiple neighboring locations, e.g., only separated by building walls, fences, or the like.

In one or more embodiments, the system comprises a plurality of laundry machines and control units at a given location, each laundry machine being operably connected to each control unit; wherein said management component, upon receipt of a pre-approved identification code from said mobile device, is configured to transmit location data of said laundry machine corresponding to said pre-approved identification code, and data related to status and/or available time slots for all of said laundry machines at said location to said mobile device using said long-range and/or short-range wireless transmission protocol; and wherein said mobile device is configured to present said data, and to use said short-range wireless transmission protocol, upon receipt of a user selection for use of one of said laundry machines, to transmit an activation signal to said control unit being operably connected to said selected laundry machine. This embodiment needs one control unit per laundry machine.

In one or more embodiments, the system comprises a laundry machine positioned at a first and a second location, each within short-range wireless reach of said mobile device; wherein said system further comprises a plurality of laundry machines and control units at each location, each laundry machine being operably connected to each control unit;

wherein said management component, upon receipt of a pre-approved identification code from said mobile device, is configured to transmit, using said long-range and/or short-range wireless transmission protocol, to said mobile device:

a) location data of said laundry machine corresponding to said pre-approved identification code positioned at said first location, and data related to status and/or available time slots for said laundry machine and other laundry machines at said first location; and b) location data of said laundry machine(s) positioned at said second location, and data related to status and/or available time slots for all of said laundry machines on said second location;

wherein said mobile device is configured to present said first and second locations as optional selections, and in response to a user selection of either said first location, or said second location, configured to present said data related to said selection, and, upon receipt of a user selection for use of one of said laundry machines, to use said short-range wireless transmission protocol to transmit an activation signal to said control unit being operably connected to said selected laundry machine.

In one or more embodiments, the mobile device, upon receipt of a user selection (e.g., via the user interface of the mobile device) for use of said laundry machine or one of said laundry machines, is configured to use said long-range and/or short-range wireless transmission protocol to transmit the starting time, ending time, duration and/or time slot for said use to said management component. This data information will allow the management component to keep track of available and occupied time slots. The information may also include which program that is selected and/or sensor information about when a laundry machine is finished. Such sensor data information may e.g., be received by the mobile device directly from a laundry machine or indirectly via the control unit operably connected to the laundry machine. Such sensor data may e.g., include humidity, water turbidity, temperature, coin status (i.e., how many coins have passed the sensor in a given time period) or the like. In one or more embodiments, the wireless signal(s) from said control unit(s) further comprises availability data, e.g., occupied, or free, about said laundry machine(s) and/or sensor data about when a laundry machine is finished; and wherein said mobile device, is configured to relay said data to said management component using said long-range and/or short-range wireless transmission protocol.

In one or more embodiments, the management component is configured to automatically allocate a predefined time slot to said user selected laundry machine.

In one or more embodiments, the management component, upon receipt of said relayed availability data about said laundry machine, and wherein one or more of said laundry machine(s) are prematurely available relative to said predefined time slot(s), is configured to reopen, i.e., make available, the remaining period of said predefined time slot(s).

In one or more embodiments, the mobile device, is configured to relay data to the management component using said long-range and/or short-range wireless transmission protocol. In the present context, the term "relay" refers to the mobile device configured to receive, decode, data regenerate, encode, and re-transmit the wireless signal from the control unit or the laundry machine.

When the laundry machine is capable of transmitting sensor data, it preferably comprises a wireless communications unit. In general, the laundry machine may comprise a wireless communications unit to be able to communicate with the control unit. In the present context, the term "wireless communications unit" may denote any electronic device, which can control, perform, and/or participate in a contactless communication, wherein data are transferred in a wireless manner. The wireless communications component may be a component within a housing. Alternatively, the wireless communications component may be a bare die or a chip. Further, the wireless communications component may comprise appropriate electric circuits, such as a transmitting circuit and/or a receiving circuit. The wireless communications unit may include data processing components and algorithms preparing (cleaning) the data prior to sending to the control unit and/or to the mobile device. Alternatively, the control unit may include data processing components and algorithms preparing (cleaning) the data prior to sending to the mobile device. The control unit may be wired to the laundry machine or may be configured to communicate wirelessly with the laundry machine. Both communication paths are suitable for the control unit to be operably connected to the laundry machine.

A data processing component may be integrated in the wireless communication unit to pre-process data before it is sent to the control unit and/or to the mobile device. Such a data processing component is e.g., present to remove erroneous data, e.g., obvious outliers, or the like.

In general, for the different described data collection and processing components to operate, the data collection and processing components may comprise a computing system including a processor, a memory, a communication unit, an output device, an input device, and a data store, which may be communicatively coupled by a communication bus. The mentioned computing system should be understood as an example and that it may take other forms and include additional or fewer components without departing from the scope of the present disclosure. For instance, various components of the computing device may be coupled for communication using a variety of communication protocols and/or technologies including, for instance, communication buses, software communication mechanisms, computer networks, etc. The computing system may include various operating systems, sensors, additional processors, and other physical configurations. The processor, memory, communication unit, etc., are representative of one or more of these components. The processor may execute software instructions by performing various input, logical, and/or mathematical operations. The processor may have various computing architectures to method data signals (e.g., CISC, RISC, etc.). The processor may be physical and/or virtual and may include a single core or plurality of processing units and/or cores. The processor may be coupled to the memory via the bus to access data and instructions therefrom and store data therein. The bus may couple the processor to the other components of the computing system including, for example, the memory, the communication unit, the input device, the output device, and the data store. The memory may store and provide data access to the other components of the computing system. The memory may be included in a single computing device or a plurality of computing devices. The memory may store instructions and/or data that may be executed by the processor. For example, the memory may store instructions and data, including, for example, an operating system, hardware drivers, other software applications, databases, etc., which may implement the techniques described herein. The memory may be coupled to the bus for communication with the processor and the other components of computing system. The memory may include a non-transitory computer-usable (e.g., readable, writeable, etc.) medium, which can be any non-transitory apparatus or device that can contain, store, communicate, propagate, or transport instructions, data, computer programs, software, code, routines, etc., for processing by or in connection with the processor. In some implementations, the memory may include one or more of volatile memory and non-volatile memory (e.g., RAM, ROM, hard disk, optical disk, etc.). It should be understood that the memory may be a single device or may include multiple types of devices and configurations. The input device may include any device for inputting information into the computing system. In some implementations, the input device may include one or more peripheral devices. The output device may be any device capable of outputting information from the computing system. The data store may include information sources for storing and providing access to data. In some implementations, the data store may store data associated with a database management system (DBMS) operable on the computing system. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. The data stored by the data store may be organized and queried using various criteria including any type of data stored by them. The data store may include data tables, databases, or other organized collections of data. The data store may be included in the computing system or in another computing system and/or storage system distinct from but coupled to or accessible by the computing system. The data stores can include one or more non-transitory computer-readable mediums for storing the data. In some implementations, the data stores may be incorporated with the memory or may be distinct therefrom. The components may be communicatively coupled by the bus and/or the processor to one another and/or the other components of the computing system. In some implementations, the components may include computer logic (e.g., software logic, hardware logic, etc.) executable by the processor to provide their acts and/or functionality. These components may be adapted for cooperation and communication with the processor and the other components of the computing system.

In one or more embodiments, the mobile device is configured to automatically save the location of said user selected laundry machine as a favorite location;

wherein when said mobile device subsequently identifies a wireless signal comprising a pre-approved identification code corresponding to a laundry machine of said favorite location, it is configured to automatically request data related to status and/or available time slots for said laundry machine(s) at said favorite location from said management component using said long-range and/or short-range wireless transmission protocol, and to present said received data as options to the user of said mobile device.

The retrieval of data for the container(s), i.e., from the sensor(s), may be performed at any time and with any frequency, depending on knowledge of use and emptying rate. Hence, the retrieval of data for the container(s) may be performed at real time or relatively often (e.g., several times each hour or day). Data from certain containers may only be interesting to retrieve once a day, or week. The retrieval of data may be performed in response to a signal sent from the management component. Alternatively, the wireless unit may be configured to automatically perform retrieval of data at predetermined or random time intervals. The predetermined time intervals may preferably be instructed by the management component.

The data collection and processing component may be configured as two individual components—a data collection component and a data processing component, but in other cases the data collection and processing component is a single component. This is merely a matter of construction and is not particularly relevant for the present invention.

As used in the specification and the appended claims, the singular forms “a”, “an”, and “the” include plural referents unless the context clearly dictates otherwise. Ranges may be expressed herein as from “about” or “approximately” one particular value and/or to “about” or “approximately” another particular value. When such a range is expressed, another embodiment includes from the one particular value and/or to the other particular value. Similarly, when values are expressed as approximations, by use of the antecedent “about”, it will be understood that the particular value forms another embodiment.

It should be noted that embodiments and features described in the context of one of the aspects of the present invention also apply to the other aspects of the invention.

REFERENCES

100 Laundry machine
200 Mobile device
300 Control unit
400 Management component

The invention claimed is:

1. A system for commercial services or service facilities comprising:

a machine;

a mobile device comprising a transceiver unit;

a control unit comprising a transceiver unit, operably connected to said machine, and communicatively coupled to said mobile device; and a management component comprising a transceiver unit, being part of a cloud platform, and communicatively coupled to said mobile device; wherein said control unit is configured to transmit a wireless signal using a short-range wireless transmission protocol, said signal comprising an identification code for said machine;

wherein said mobile device is configured to transmit and receive wireless signals using a short-range wireless transmission protocol, and to transmit and receive wireless signals using a long-range wireless transmission protocol;

wherein said management component is configured to transmit and receive wireless signals using a long-range and/or a short-range wireless transmission protocol;

wherein said management component is configured to transmit a list of pre-approved identification codes to said mobile device using said long-range and/or short-range wireless transmission protocol, each of said identification codes corresponding to a machine;

wherein said mobile device is configured to, using said short-range wireless transmission protocol, search for wireless signals comprising a pre-approved identification code from said list of pre-approved identification codes, and to communicate identified pre-approved identification codes to said management component using said long-range and/or short-range wireless transmission protocol;

wherein said management component, upon receipt of a pre-approved identification code from said mobile device, is configured to transmit location data of said machine, and data related to status and/or available time slots for said machine, or said area controlled by said machine, to said mobile device using said long-range and/or short-range wireless transmission protocol;

wherein said mobile device is configured to present said data, and to use said short-range wireless transmission protocol to transmit an activation signal to said control unit upon receipt of a user selection for use of said machine or said area controlled by said machine.

2. The system according to claim 1, comprising a plurality of machines at a given location, wherein said management component, upon receipt of a pre-approved identification code from said mobile device, is configured to transmit location data of said machine corresponding to said pre-approved identification code, and data related to status and/or available time slots for all of said machines at said location to said mobile device using said long-range and/or short-range wireless transmission protocol; and wherein said mobile device is configured to present said data, and to use said short-range wireless transmission protocol to transmit an activation signal to said control unit upon receipt of a user selection for use of one of said machines.

3. The system according to claim 1, comprising a machine positioned at a first and a second location, each within short-range wireless reach of said mobile device;

wherein said management component, upon receipt of a pre-approved identification code from said mobile device, is configured to transmit, using said long-range and/or short-range wireless transmission protocol, to said mobile device:

a) location data of said machine corresponding to said pre-approved identification code positioned at said first location, and data related to status and/or available time slots for said machine and, optionally, other machines at said first location; and b) location data of said machine(s) positioned at said second location, and data related to status and/or available time slots for all of said machines on said second location;

wherein said mobile device is configured to present said first and second locations as optional selections, and in response to a user selection of either said first location, or said second location, configured to present said data related to said selection, and to use said short-range wireless transmission protocol to transmit an activation signal to said control unit upon receipt of a user selection for use of one of said machines.

4. The system according to claim 1, comprising a plurality of machines and control units at a given location, each machine being operably connected to each control unit; wherein said management component, upon receipt of a pre-approved identification code from said mobile device, is configured to transmit location data of said machine corresponding to said pre-approved identification code, and data related to status and/or available time slots for all of said machines at said location to said mobile device using said long-range and/or short-range wireless transmission protocol; and wherein said mobile device is configured to present said data, and to use said short-range wireless transmission protocol, upon receipt of a user selection for use of one of said machines, to transmit an activation signal to said control unit being operably connected to said selected machine.

5. The system according to claim 1, comprising a machine positioned at a first and a second location, each within short-range wireless reach of said mobile device;

wherein said system further comprises a plurality of machines and control units at each location, each machine being operably connected to each control unit;

wherein said management component, upon receipt of a pre-approved identification code from said mobile device, is configured to transmit, using said long-range and/or short-range wireless transmission protocol, to said mobile device:

a) location data of said machine corresponding to said pre-approved identification code positioned at said first location, and data related to status and/or available time slots for said machine and other machines at said first location; and b) location data of said machine(s) positioned at said second location, and data related to status and/or available time slots for all of said machines on said second location;

wherein said mobile device is configured to present said first and second locations as optional selections, and in response to a user selection of either said first location, or said second location, configured to present said data related to said selection, and, upon receipt of a user selection for use of one of said machines, to use said short-range wireless transmission protocol to transmit an activation signal to said control unit being operably connected to said selected machine.

6. The system according to claim 1, wherein said mobile device, upon receipt of a user selection for use of said machine or one of said machines, is configured to use said long-range and/or short-range wireless transmission protocol to transmit the starting time, ending time, duration and/or time slot for said use to said management component.

7. The system according to claim 6, wherein said management component is configured to automatically allocate a predefined time slot to said user selected machine.

8. The system according to claim 1, wherein said wireless signal(s) from said control unit(s) further comprises availability data, e.g., occupied, or free, about said machine(s); and wherein said mobile device, is configured to relay said data to said management component using said long-range and/or short-range wireless transmission protocol.

9. The system according to claim 8, wherein said management component, upon receipt of said relayed availability data about said machine, and wherein one or more of said machine(s) are prematurely available relative to said predefined time slot(s), is configured to reopen, i.e., make available, the remaining period of said predefined time slot(s).

10. The system according to claim 1, wherein said mobile device is configured to automatically save the location of said user selected machine as a favorite location;

wherein when said mobile device subsequently identifies a wireless signal comprising a pre-approved identification code corresponding to a machine of said favorite location, it is configured to automatically request data related to status and/or available time slots for said machine(s) at said favorite location from said management component using said long-range and/or short-range wireless transmission protocol, and to present said received data as options to the user of said mobile device.

* * * * *